(12) United States Patent
Merkel et al.

(10) Patent No.: US 9,127,728 B2
(45) Date of Patent: Sep. 8, 2015

(54) METHOD FOR THE LOAD-FREE OPENING OF A SEPARATING CLUTCH

(75) Inventors: Tino Merkel, Schwieberdingen (DE); Markus Peter, Zaberfeld (DE)

(73) Assignee: ROBERT BOSCH GMBH, Stuttgart (DE)

( * ) Notice: Subject to any disclaimer, the term of this patent is extended or adjusted under 35 U.S.C. 154(b) by 175 days.

(21) Appl. No.: 13/876,973

(22) PCT Filed: Aug. 8, 2011

(86) PCT No.: PCT/EP2011/063600
§ 371 (c)(1),
(2), (4) Date: Jun. 21, 2013

(87) PCT Pub. No.: WO2012/041585
PCT Pub. Date: Apr. 5, 2012

(65) Prior Publication Data
US 2013/0282248 A1 Oct. 24, 2013

(30) Foreign Application Priority Data
Sep. 29, 2010 (DE) .......................... 10 2010 041 581

(51) Int. Cl.
*B60W 10/02* (2006.01)
*B60W 10/08* (2006.01)
(Continued)

(52) U.S. Cl.
CPC ............... *F16D 48/06* (2013.01); *B60W 10/02* (2013.01); *B60W 10/08* (2013.01); *B60W 30/18* (2013.01)

(58) Field of Classification Search
CPC ..... B60W 10/08; B60W 10/02; B60W 30/19; B60W 10/10; B60W 2710/083; B60W 2710/105; B60W 2710/027; B60W 2710/1055; B60W 30/1882; B60W 30/18; F16H 63/502; F16H 2306/48; F16H 61/0403; F16H 61/061; F16H 61/143; F16H 2306/54; F16H 61/0437; F16H 3/126; F16H 2061/0433; F16H 2306/44; F16H 61/682; F16D 48/06
See application file for complete search history.

(56) References Cited

U.S. PATENT DOCUMENTS 5,730,683 A * 3/1998 Usuki et al. .................. 477/143
5,890,994 A * 4/1999 Sawamura et al. .......... 477/181
(Continued)

FOREIGN PATENT DOCUMENTS

CN 1230645 A 10/1999
CN 1277117 A 12/2000
(Continued)

OTHER PUBLICATIONS

AsSoonAs.pdf (Soon—Definition and More from the Free Merriam-Webster Dictionary, Nov. 25, 2014, http://www.merriam-webster.com/dictionary/soon, pp. 1-3).*
(Continued)

*Primary Examiner* — Bao Long T Nguyen
(74) *Attorney, Agent, or Firm* — Kenyon & Kenyon LLP

(57) ABSTRACT

A method is provided for the load-free opening of a separating clutch. The method includes the following steps: receiving a signal for disengaging the clutch; applying a negative torque at the separating clutch using a drive machine; applying a positive, predefined torque at the separating clutch using the drive machine; and opening the separating clutch as soon as the amount of the torque applied at the separating clutch lies within predefined limit values. In other words, a torque in the known range of the system is set via a drive-side deceleration. Then, a drive-side acceleration takes place, so that the torque is increased on the drive side, starting from the known range of the system, until it generally matches the torque on the output side. This enables a load-free opening of the clutch.

7 Claims, 2 Drawing Sheets

(51) Int. Cl.
*B60W 30/18* (2012.01)
*F16D 48/06* (2006.01)

(56) References Cited

U.S. PATENT DOCUMENTS

| | | | |
|---|---|---|---|
| 6,018,198 A * | 1/2000 | Tsuzuki et al. | 290/17 |
| 6,342,027 B1 * | 1/2002 | Suzuki | 477/5 |
| 6,550,352 B2 * | 4/2003 | Okada et al. | 74/335 |
| 6,675,083 B2 * | 1/2004 | Amisano et al. | 701/51 |
| 6,679,133 B1 * | 1/2004 | Kayano et al. | 74/335 |
| 6,881,171 B2 * | 4/2005 | Kuhstrebe et al. | 477/78 |
| 7,090,615 B2 * | 8/2006 | Matsumura et al. | 477/78 |
| 7,194,926 B2 * | 3/2007 | Sakamoto et al. | 74/335 |
| 7,370,715 B2 * | 5/2008 | Colvin et al. | 180/65.28 |
| 8,412,426 B2 * | 4/2013 | Sah | 701/64 |
| 2002/0038174 A1 * | 3/2002 | Koumura et al. | 701/51 |
| 2004/0087413 A1 * | 5/2004 | Ozaki et al. | 477/79 |
| 2004/0152558 A1 * | 8/2004 | Takami et al. | 477/3 |
| 2007/0197343 A1 * | 8/2007 | Sakamoto et al. | 477/70 |
| 2008/0254941 A1 * | 10/2008 | Scott et al. | 477/169 |
| 2009/0017989 A1 * | 1/2009 | Karlsson et al. | 477/181 |
| 2009/0254258 A1 * | 10/2009 | Ishikawa et al. | 701/68 |
| 2010/0203995 A1 * | 8/2010 | Zhang et al. | 475/5 |
| 2010/0228412 A1 * | 9/2010 | Sah | 701/22 |
| 2011/0266112 A1 | 11/2011 | Tellermann et al. | |

FOREIGN PATENT DOCUMENTS

| | | |
|---|---|---|
| DE | 10 2006 003 715 | 8/2007 |
| DE | 10 2008 042 056 | 3/2010 |
| EP | 1 522 764 | 4/2005 |

OTHER PUBLICATIONS

International Search Report and Written Opinion, PCT International Application No. PCT/EP2011/063600, dated Jan. 18, 2012.

* cited by examiner

METHOD FOR THE LOAD-FREE OPENING OF A SEPARATING CLUTCH

BACKGROUND INFORMATION

A clutch such as a claw clutch is used in electric and hybrid vehicles, especially in the case of electrically driven axles, for the purpose of separating the electric drive from the wheels to be driven.

The claw clutch can be opened only if no torque, or only a very small torque, is applied at the coupling point. This requirement is able to be satisfied in that losses produced by friction, for instance, are compensated, for example via the electric drive. However, it is difficult to produce the operating state that ensures a torque-free state at the coupling point without additional measurements and calculations.

SUMMARY

Therefore, there may be need for a better method for opening the clutch, in which a torque-free operating state of the clutch is produced in reliable and rapid manner.

Features, details and possible advantages of a device according to one specific embodiment of the present invention are described in detail below. According to a first aspect of the present invention, an example method for the load-free opening of a separating clutch is provided. The example method includes the following steps: receiving a signal for disengaging the clutch; applying a negative torque at the separating clutch using a drive machine; applying a positive, predefined torque at the separating clutch using a drive machine; and opening the separating clutch as soon as the amount of the torque applied at the separating clutch lies within predefined limit values. The negative torque is smaller than the torque on an output side, and the positive torque is greater than the torque on the output side.

In other words, in accordance with an example embodiment of the present invention, an adjustment is provided of the torque in the known range of the system by means of a drive-side deceleration, and a subsequent drive-side acceleration, so that the torque is increased over time by the drive side, starting from the known range of the system, until it generally matches the torque on the output side. This enables a load-free opening of the clutch.

The separating clutch is developed to transmit torques between a drive side, e.g., a shaft connected to the engine, and an output side, e.g., a shaft connected to a vehicle axle. A first part of the clutch may be connected to the drive side for this purpose and a second part to the output side. The separating clutch may be developed as a claw clutch, for example.

First, a signal for disengaging the clutch is received by a control unit, for example. The signal for disengaging the clutch, for example, may be based on an automatic error detection or be generated by a user such as the driver.

In the next step, a drive-side negative torque is applied at the clutch by means of a drive machine, such as an electric motor. The negative torque is smaller than the torque of an output side. In other words, the negative torque counteracts the rotation of an axle connected to the wheels, for example. Expressed differently, the deceleration is implemented via the drive machine in this case.

The torque may be applied by transmitting a corresponding deceleration signal via a control unit to the drive machine, for example.

Following a certain period of time, possibly predefined, a positive predefined torque is applied at the clutch. In other words, the drive machine is used for acceleration, so that the torque on the drive side is greater than the torque on the output side. The positive torque is predefined, i.e., a linear acceleration takes place, for instance, so that a torque ramp is run through in terms of time. The defined rise of the torque ensures that a torque-free state is present at the clutch after a certain period of time.

A predefined period of time, during which the negative torque is applied, may elapse before applying the positive torque. This time interval may be machine-dependent and, for example, depend on the efficiency of the deceleration process and the length of time it takes until the amount of the drive-side torque has dropped below the amount of the output-side torque. This time period may amount to 10 to 20 milliseconds (ms), for example.

As soon as the amount of the torque applied at the separating clutch lies within predefined limit values, the separating clutch is opened. In other words, as soon as the difference of the output-side and the drive-side torque lies within specific threshold values, the clutch is essentially in a load-free state and is able to be opened in reliable manner. The limit value may be set to 4 Newton-meter (Nm), for example. This makes it possible to ensure driving comfort, for instance when opening a clutch in a vehicle, because the lower the limit values are set, the less noticeable and jerk-free the clutch is able to be opened.

According to a second aspect of the present invention, a control unit is provided, which is set up to control the afore-described method. The control unit may be connected to the separating clutch and to the drive machine for this purpose.

According to a third aspect of the present invention, a computer program element is provided, which is storable on a computer-readable medium according to a further aspect of the present invention. The computer program element is developed to execute or to control the afore-described method when it is running on a processor.

The example method according to the present invention, the example control unit and the example computer program element are able to ensure that the clutch is opened in a robust, reliable and safe manner.

One skilled in the art will be able to gather additional features and advantages of the present invention from the following description of exemplary specific embodiments with reference to the figures, which, however, should not be seen as limiting the present invention.

DETAILED DESCRIPTION OF EXAMPLE EMBODIMENTS

Figure 1:
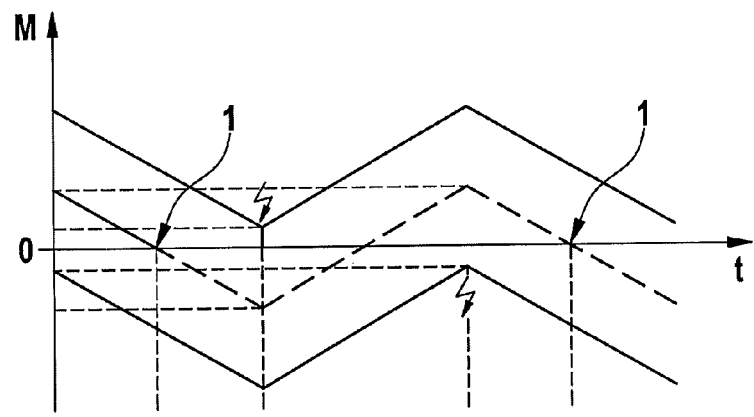
FIG. 1 schematically shows the time characteristic of a torque when attempting to produce a torque-free state at a separating clutch.

All of the figures are merely schematic representations of the example method according to the present invention or its method steps. Clearances and size relationships, in particular, are not reflected true to scale in the figures. Corresponding elements are provided with the same reference numerals in the different figures.

FIG. 1 illustrates the time characteristic of a torque when attempting to produce a torque-free state at a separating clutch. In the illustrated coordinate system, time t, in milliseconds, has been plotted on the abscissa, and torque M, in Newton meters, has been plotted on the ordinate.

A virtual absence of torque must be produced at the coupling point to open the clutch. To do so, an attempt may be made to compensate the friction losses. If this is unsuccessful, the alternative consists of attempting to set a torque at the coupling point that is slightly higher than zero, using an electric drive, for example, and then to run through a torque ramp having a negative gradient, so that zero crossing 1 of the torque is run through at the coupling point and the clutch is able to be opened.

If no torque sensor is employed, the torque is able to be calculated by acquiring other variables of the drive. However, this calculation may include errors if there is a change in variables required for calculating the mechanical torque of the electric drive in the system or if these variables are unable to be applied precisely. That is to say, if the starting point of the torque characteristic is unable to be determined with precision, in the afore-described method it may happen that the zero crossing of the torque characteristic is not nearly reached, or that the required range is reached only insufficiently, and the clutch cannot be opened.

Three different torque characteristics are illustrated in FIG. 1. The middle torque characteristic, shown by the dashed lines, leads to success in the afore-described procedure. At the points denoted by 1 the clutch is in a load-free state and is able to be opened.

However, the procedure fails if the starting point of the torque ramp featuring a negative gradient is not known. This is illustrated in the upper and lower torque characteristics in FIG. 1. There, no zero crossing 1 is reached and the clutch can not be opened. This error case is denoted by a flash in FIG. 1.

Figure 2:
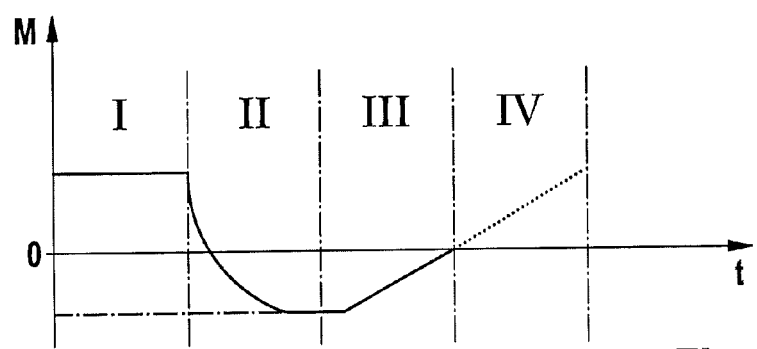
FIG. 2 schematically shows the time characteristic of a torque when executing the method according to an exemplary embodiment of the present invention.

FIG. 2 schematically shows the time characteristic of a torque when executing the example method according to an exemplary embodiment of the present invention. The torque applied at the part of the clutch which is connected to the drive is plotted on the ordinate. It is shown in relation to the torque at the part of the clutch that is connected to the output side, i.e., at a zero torque, the torques applied on both sides of the clutch are the same, so that a load-free opening of the clutch is possible.

In a first phase I, a constant, linear torque characteristic is illustrated. This torque, for instance, is applied at the clutch during normal operation of the system. In second phase II, once a clutch-disengagement signal has been received, for example, a negative torque is applied at the clutch, for instance with the aid of the drive such as an electric machine. This causes a drop in torque and following a specific period of time, the torque adjusts to a value below the x-axis in FIG. 2. As a result, the state of the system is known and thus a starting point of, for example, a torque ramp to be run through. In phase II, the torque decreases, e.g., along a hyperbola, and following a machine-specific period of time of 10 to 20 ms, for instance, the torque adjusts to a value that corresponds to the torque of the free-running electric machine, for instance.

In a third phase III, it is possible to switch to an active mode of the drive, e.g., an engine speed regulation, a torque control or similar control, and a positive torque thus is able to be applied at the clutch. This makes it possible to bring the torque out of the negative and into the positive range. As an alternative, a ramp featuring a predefined gradient or a predefined curve characteristic may be run through, until the zero crossing has been reached. The clutch is able to be opened when crossing zero. In the fourth phase IV, finally, an acceleration may take place and a transition to normal operation, for instance.

Two options are provided for applying the negative torque by means of the drive in phase II: The negative torque is set by free-running of the drive machine or by means of an active short circuit of the drive machine.

When the electric drive is switched to free running, the electrical machine rotates without being able to set an electric torque. In other words, the electric machine is passive and pulled along by the movement of the vehicle and the linkage to the axle. Thus, the friction and inertia of the electric machine produce a negative torque at the clutch, which counteracts the rotation of the output-side axle (phase II in FIG. 2). It is therefore known that the torque at the coupling point of the clutch is negative, and a positive torque is able to be applied.

The frictional torque increases with decreasing rotational speed. For example, if a permanently excited synchronous machine (PSM) is used as electric machine, the voltage in the intermediate circuit of the rectifier may become too high in free running operation. This risk, which may lead to the destruction of the rectifier, increases at higher rotational speeds. Using the following measures, it is therefore possible to ensure that no exceedance of the maximum of the intermediate circuit voltage will arise:

If, when using as drive an electric machine featuring excitation, e.g., a PSM, the electrical drive is switched into an active short-circuit, so that the terminals of the stator windings are short-circuited, a short-circuit torque featuring a negative operational sign will be produced. The short-circuit torque counteracts the rotation of the drive, and its amount decreases with increasing rotational speed. In other words, in the case of an active short-circuit, it is likewise known that the torque at the coupling point of the clutch is negative.

Figure 3:
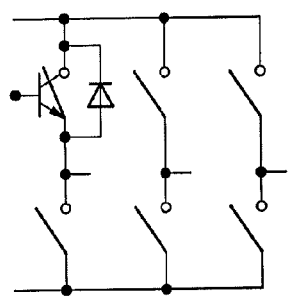
FIG. 3 schematically shows a segment of the actuation of the electric drive in free-running mode according to an exemplary embodiment of the present invention.
Figure 4A:
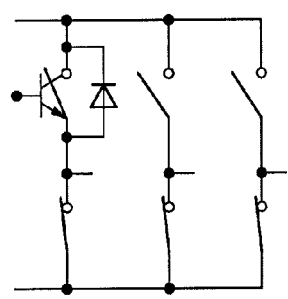
FIG. 4 schematically shows a segment of the actuation of the electric drive in an active short-circuit according to an exemplary embodiment of the present invention.
Figure 4B:
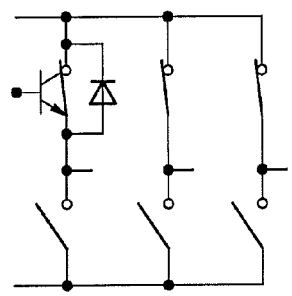

FIG. 3 illustrates the actuation of transistors of the drive in the afore-described free running. In the process, all semiconductors are open, for instance. FIGS. 4A and 4B show alternative actuation options for the actuation of transistors of the drive in an active short-circuit. The semiconductors are partially closed and partially open for this purpose.

When using an electric machine such as a PMS as drive, for example, the switch to deceleration operation may be implemented as a function of the rotational speed. To do so, a current rotational speed may be determined, for instance by a control unit. If the determined rotational speed value lies below a predefined threshold value, the electric machine may be switched to free running and a negative torque be applied to the drive side of the clutch as a result. The characteristic of the torque in free running is known and a function of the design of the drive machine, for example.

If the determined current rotational speed value lies above the threshold value, there is the risk that the intermediate circuit voltage of the rectifier becomes too high, and the electric machine is switched to an active short-circuit.

Figure 5:
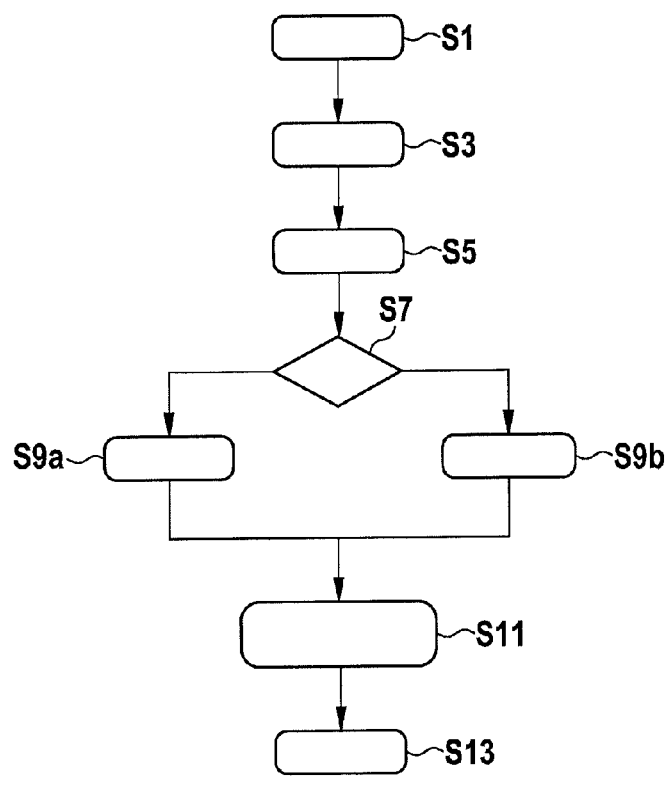
FIG. 5 shows a schematic flow diagram of the method according to an exemplary embodiment of the present invention.

FIG. 5 schematically illustrates a flow diagram of the method according to one exemplary embodiment of the present invention. In step S1, a signal for disengaging the clutch is received, e.g., by a control unit. The signal for disengaging the clutch may be based on an automatic error detection, for example, or be generated by a user such as the driver. For instance, the signal for disengaging the clutch may contain the information that the drive machine has reached the maximum rotational speed.

In step S3, the clutch-disengagement process is started. Toward this end, a current rotational speed value is determined in step S5. In step S7, the determined current rotational speed is compared to a threshold value. Depending on the rotational speed, one of the following methods is used in step 9a, 9b to apply a brake torque, i.e., a negative torque, at the clutch on the drive side. If the determined rotational speed is less than the threshold value, the drive machine is switched to free running operation in step 9a. If the determined rotational speed is greater than the threshold value, the drive machine is switched to the active short-circuit in step 9b.

Following the controlled deceleration, the system is below the zero line in the system shown in FIG. 2. In this way a zero crossing is able to be induced by accelerating the drive machine in step S11. In the zero crossing, the clutch is in a torque-free state, so that the clutch is able to be released or the clutch disengaged in step S13. The afore-described steps may be executed or actuated automatically, i.e., without human intervention, for instance by a control unit which is connected to the involved components of the system.

Finally, it should be noted that terms like "having" or similar ones should not exclude that additional elements or steps might be provided. Furthermore, it is pointed out that the article "a" or "an" does not exclude a plurality. Moreover, features described in connection with the various specific embodiments may be combined with one another as desired.

What is claimed is:

1. A method for the load-free opening of a separating clutch, comprising:
   receiving a signal for disengaging the separating clutch;
   applying a negative torque at the separating clutch by a drive machine,
      wherein the negative torque is set by one of a free running of the drive machine or by an active short-circuit of the drive machine, the negative torque being smaller than a torque of an output side;
   applying a positive, predefined torque at the separating clutch by the drive machine, the positive torque being greater than the torque of the output side; and
   opening the separating clutch as soon as an amount of the torque applied at the separating clutch lies within predefined limit values.

2. The method as recited in claim 1, wherein the positive predefined torque is applied following a predefined time interval after applying the negative torque.

3. The method as recited in claim 1, further comprising:
   detecting a rotational speed of the drive machine;
   applying the negative torque by an active short-circuit of the drive machine in the event that the detected rotational speed is greater than a threshold value; and
   applying the negative torque by a switch to free running operation of the drive machine in the event that the detected rotational speed is less than the threshold value.

4. A control unit for actuating a separating clutch, wherein the control unit is configured to receive a signal for disengaging the separating clutch, to actuate a drive machine connected to the separating clutch in such a way that a negative torque is applied at the separating clutch, wherein the negative torque is set by one of a free running of the drive machine or by an active short-circuit of the drive machine, the negative torque being smaller than the torque of the output side, to actuate the drive machine connected to the separating clutch in such a way that a positive torque is applied at the separating clutch following a predefined time interval, the positive torque being greater than the torque of the output side, and to open the separating clutch as soon as an amount of the torque applied at the separating clutch lies within predefined limit values.

5. The control unit as recited in claim 4, wherein the control unit is configured to compare an instantaneous actual rotational speed of the drive machine to a threshold value.

6. A computer storage medium storing a computer program for a load-free opening of a separating clutch, the computer program, when executed by a processor, causing the processor to perform the steps of:
   receiving a signal for disengaging the separating clutch;
   applying a negative torque at the separating clutch by a drive machine,
   wherein the negative torque is set by one of a free running of the drive machine or by an active short-circuit of the drive machine, the negative torque being smaller than a torque of an output side;
   applying a positive, predefined torque at the separating clutch by the drive machine, the positive torque being greater than the torque of the output side; and
   opening the separating clutch as soon as the amount of the torque applied at the separating clutch lies within predefined limit values.

7. A processor containing a stored computer program for a load-free opening of a separating clutch, the computer program, when executed by a processor, causing the processor to perform the steps of:
   receiving a signal for disengaging the separating clutch;
   applying a negative torque at the separating clutch by a drive machine,
   wherein the negative torque is set by one of a free running of the drive machine or by an active short-circuit of the drive machine, the negative torque being smaller than a torque of an output side;
   applying a positive, predefined torque at the separating clutch by the drive machine, the positive torque being greater than the torque of the output side; and
   opening the separating clutch as soon as the amount of the torque applied at the separating clutch lies within predefined limit values.

* * * * *